Dec. 19, 1944.  R. F. HOHMAN  2,365,270
APPARATUS FOR FEEDING MATERIAL AT A CONSTANT RATE
Filed May 12, 1942  5 Sheets-Sheet 1

INVENTOR
*Robert F. Hohman*
BY *John O. Seifert*
ATTORNEY

Fig. 4.

Dec. 19, 1944.　　　　R. F. HOHMAN　　　　2,365,270
APPARATUS FOR FEEDING MATERIAL AT A CONSTANT RATE
Filed May 12, 1942　　　　5 Sheets-Sheet 3

Fig. 5.

INVENTOR
Robert F. Hohman
BY John O. Seifert
ATTORNEY

Dec. 19, 1944. R. F. HOHMAN 2,365,270
APPARATUS FOR FEEDING MATERIAL AT A CONSTANT RATE
Filed May 12, 1942 5 Sheets-Sheet 4

Fig. 6.

INVENTOR
Robert F. Hohman
BY
ATTORNEY

Dec. 19, 1944.  R. F. HOHMAN  2,365,270
APPARATUS FOR FEEDING MATERIAL AT A CONSTANT RATE
Filed May 12, 1942  5 Sheets-Sheet 5

INVENTOR
Robert F. Hohman
BY John O. Seifert
ATTORNEY

Patented Dec. 19, 1944

2,365,270

UNITED STATES PATENT OFFICE 2,365,270

APPARATUS FOR FEEDING MATERIAL AT A CONSTANT RATE

Robert F. Hohman, Passaic, N. J., assignor to Merrick Scale Mfg. Company, Passaic, N. J., a corporation of New Jersey Application May 12, 1942, Serial No. 442,720

26 Claims. (Cl. 222—55)

This invention relates to apparatus for continuously feeding and weighing material including a continuous traveling conveyer to receive and feed material in a stream from a source of supply of the material, and relates particularly to apparatus of this character wherein the conveyer is mounted on a carrier frame therefor pivotally supported to have movement about a horizontal axis, the material being discharged onto the conveyer from the outlet of a bin or receptacle and fed by the conveyer from the receptacle in a stream of predetermined weight to which the weighing mechanism is adjusted and set, the discharge of the material from the receptacle being controlled by an adjustable gate for regulating the receptacle outlet. The weight of the stream of material fed from the receptacle by the conveyer may vary due to variations in the specific gravity of the material itself, or by the crowding of lumps of material below the gate, and to compensate for such variations in the weight of the material and to discharge the material in a stream of predetermined weight the gate is operatively connected to the conveyer carrier to effect adjustment of the gate from and by the tilting movement of the conveyer carrier effected by variations, such as an increase or a decrease, in the weight of the material fed by the conveyer from the receptacle, the conveyer carrier also serving to retain the gate in adjusted position. The stream of material fed by the conveyer from the receptacle outlet resists movement of the gate relative to such stream of material to increase or decrease the area of the receptacle outlet, which in turn resists the tilting movement of the conveyer carrier and thus interferes with the accurate weighing of the material.

It is an object of the invention to overcome the above disadvantages in apparatus of this character wherein the outlet means of a material supply bin or receptacle is arranged to discharge material of predetermined volume from the receptacle onto the conveyer, and the provision of means for regulating the operation of the conveyer actuating means to vary the speed of travel of the conveyer, means to manually adjust and set said regulating means to cause the conveyer actuating means to drive the conveyer at a predetermined speed and feed a stream of material of predetermined weight from the receptacle, and continuously operating means for actuating said adjusting means normally disconnected therefrom and adapted to be connected thereto by a variation in the weight of the material on the conveyer to actuate said adjusting means to adjust the regulating means for the conveyer actuating means to vary the speed of travel of the conveyer in inverse proportion to the variation in the weight of the material fed by the conveyer.

It is another object of the invention to provide in apparatus of this character indicating means adapted to be set by the means to adjust and set the regulating means for the conveyer actuating means to indicate the weight at the rate of which the material is discharged off of the conveyer.

It is a further object of the invention to provide means to set the weighing mechanism to counterbalance material of predetermined weight on the conveyer, and to provide variable speed actuating means for the conveyer and means to set said variable speed actuating means to actuate the conveyer at a speed to feed material at the rate of the predetermining weight for which the weighing mechanism has been set, and means rendered active by a variation in said weight of the material fed by the conveyer to vary the speed of travel of the conveyer in inverse proportion to said variation in the predetermined weight of the material.

It is another object of the invention to provide in apparatus of this character means to integrate and register the cumulative weight of the material fed by the conveyer.

Other objects and advantages of the invention will hereinafter appear.

In the drawings accompanying and forming a part of this application

Figures 1, 2, 3:
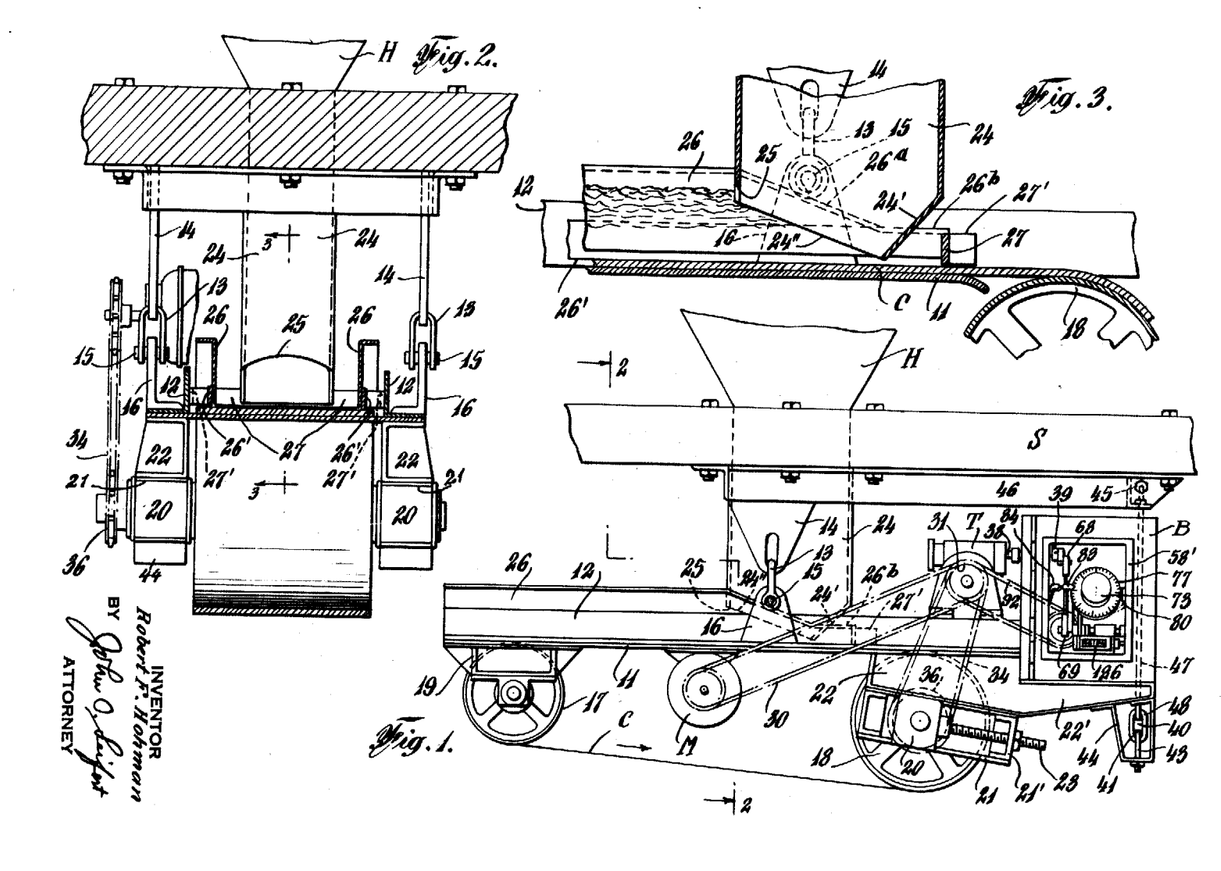
Figure 1 is a side elevation of apparatus for continuously weighing and feeding material at a constant rate from a source of supply of the material and showing an embodiment of the invention.
Figure 2 is a cross sectional view, on an enlarged scale, taken on the line 2—2 of Figure 1 looking in the direction of the arrows, and showing an adjustable gate for the outlet of a material supply receptacle, and means to set the gate at a fixed point to control the discharge of material from the receptacle.
Figure 3 is a sectional view in perspective of the means for controlling the discharge of material from the receptacle onto the conveyer.

In carrying out the embodiment of the invention illustrated in the drawings a carrier frame for a continuously traveling receiver, shown as a traveling belt conveyer C, for the material to be fed is pivotally supported intermediate its ends to have tilting movement about a horizontal axis. The carrier frame comprises a plate 11 and side members or stringers 12 of angle form in cross section fixed by a leg of the angle members upon the plate with the edges flush with the side edges of the plate and extending inwardly therefrom, the other leg of the angle members extending vertically upward from the plate and extending in parallel spaced relation, as shown in Figure 2. As shown the carrier frame is pivotally supported or suspended from a suitable support S by clevises 13 engaging in openings in brackets 14 fixed to and extending downwardly from the support S with knife edge pivot pins 15 fixed in and extending from opposite sides of brackets 16 fixed to and extending upwardly from the side frame members 12 intermediate the ends thereof and the knife edge of said pivot pins having a bearing on the wall of openings in the ends of the clevises. The conveyer belt passes around and is supported by pulleys 17, 18 and travels in the direction indicated by the arrow in Figure 1. The pulley 17 is journaled in hangers 19 fixed to and extending downwardly from the opposite side members of the carrier frame adjacent the forward end thereof. The pulley 18 is journaled in bearing blocks 20 slidably mounted in slideways inclining slightly to the horizontal in members 21 fixed to brackets 22 fixed to and extending downwardly from adjacent the ends of the side members of the frame opposite the ends to which the hangers 19 are fixed, the brackets 22 having a portion 22' extending from the end of the carrier frame. It will be obvious that the slideways may be arranged directly in the brackets 22. To adjust the bearing blocks 20 to take up slack in the conveyer belt screw threaded stems 23 are fixed at one end to and extend laterally from the bearing blocks through openings in a member 21' fixed in an end of the slideway in the members 21 with a nut or nuts threaded onto the end of said stems at the outer side of said members 21'.

The material to be fed by the conveyer is supplied to the conveyer from a source of supply of the material, shown as a receptacle or hopper H having an outlet member or chute 24 of rectangular form in cross section extended downwardly from the receptacle and through which the material is discharged from the receptacle onto the conveyer from above the axis of support 15 of the conveyer carrier frame. The lower portion of the rear wall of the outlet member or chute 24 declines forwardly toward and terminates adjacent the conveyer, as shown at 24' in Figure 3, and the bottom edge 24" of the opposite side walls of the chute inclines forwardly from the edge of the declining portion 24' of the rear wall toward the bottom edge 25 of the front wall of the chute, said latter edge constituting the cut off edge for the material fed from the chute and is preferably of slightly arcuate form, as shown in Figure 2, which facilitates egress of material, particularly lumps of the material, from the chute, and disposing said edge so that the mean center of said edge is in horizontal alinement with the fulcrum of the knife edge of the pivot pins 15 with the wall of the eyes at the ends of the clevises 13, and the bottom edge 24" of the side walls of the outlet member or chute 24 arranged at an angle relative to the conveyer equal to or less than the angle of repose of the material fed onto the conveyer. By this arrangement any pressure of the material in the hopper or bin H having a tendency to cause the right hand end of the conveyer carrier frame to tilt upwardly, as viewed in Figure 1, is immediately relieved by the pulling away of the material by the conveyer from the outlet member or chute without any tendency of the resistance of the movement of the material with the conveyer exerting a turning moment on the conveyer carrier frame which will interfere with the balancing of the material on the conveyer.

To prevent material discharged from the chute or outlet member onto the conveyer flushing from the sides of the conveyer side boards 26 are disposed to extend in spaced relation above and within the opposite side edges of the conveyer belt, each side board having a skirt 26' preferably of flexible material extended downwardly therefrom to engage the conveyer belt. A portion of the side boards 26 extending from the front wall of the chute 24 to the forward end of the conveyer carrier frame is of a width to extend above the bottom edge 25 of the front wall of the chute, as shown in Figures 1 and 2, and said portion of the side boards merging with a portion extending above the edges 24" of the sidewalls of the chute and declining at substantially the same angle as said edges 24" of the side walls, as at 26ª, and which portion merges with a horizontal portion 26ᵇ extending above the angle formed by the bottom edge 24" of the side walls of the chute 24 and the portion 24' of the rear wall of the chute, said portions 26ᵇ extending slightly beyond the chute and connected at the ends by a cross member 27 of a height equal to and extending laterally from the portions 26ᵇ with the ends flanged laterally and secured, as by welding or otherwise, to the side members 12 of the conveyer carrier frame, as at 27'. The upper portion of the side boards is preferably flanged laterally, as shown in Figure 3. The space between the forward ends of the side members 26 is open to permit of feeding the material off from the conveyer.

Figure 6:
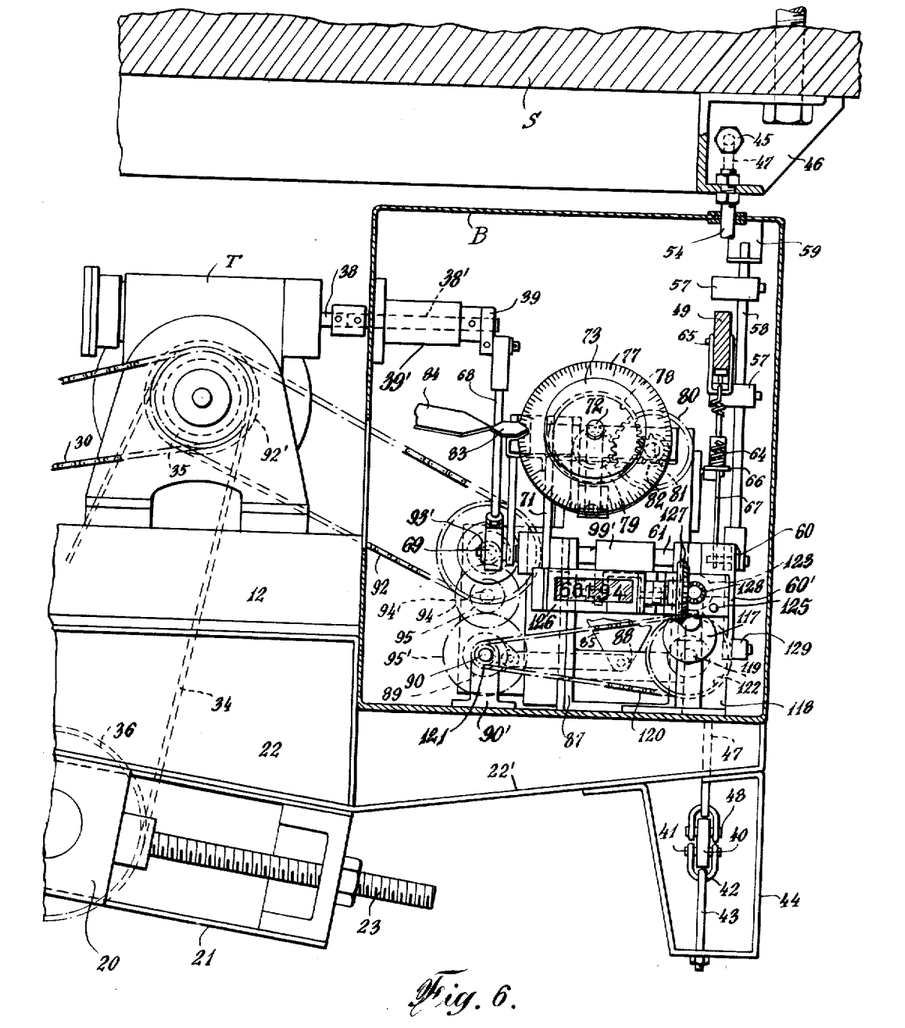
Figure 6 is a side elevation looking at the left of Figure 4 and the enclosing housing shown in section.

The conveyer is driven by an electric motor M fixed to and suspended from below one of the side members 12 of the frame forward of the horizontal axis of support thereof, and to vary the speed of travel of the conveyer the power of the motor is transmitted to the conveyer through a variable speed power transmission mechanism, shown in a conventional manner at T, mounted upon the carrier frame at the side of its pivotal support opposite the side from which the motor is suspended. The motor is operatively connected to the variable speed power transmission mechanism T by a sprocket chain 30 passing around a sprocket wheel fixed on the shaft of the motor M and a sprocket wheel fixed on the input shaft of the transmission mechanism, as shown at 31 in Figure 4. The output shaft 32 of the power transmission mechanism T is connected by a coupling to the input shaft 33 of a speed reducing mechanism, shown in a conventional manner at R, mounted on the conveyer carrier frame in axial alinement with the power transmission mechanism T. The conveyer is actuated from said speed reducing mechanism by a sprocket chain 34 passing around a sprocket wheel fixed on the output shaft of said speed reducing mechanism, as at 35, and around a sprocket wheel 36 fixed on the shaft of the conveyer pulley 18. The variable speed power transmission mechanism T may be of any suitable type, and that shown is of the type known as the "Graham" variable speed power transmission mechanism. This mechanism utilizes the compound planetary gear system wherein the speed is varied from zero to maximum and vice versa, the non-rotating member of the mechanism consisting of a traction ring frictionally engaged by and adjustable longitudinally of a pair of tapered revoluble rollers constituting a part of and revoluble with the driving element and said rollers carrying a pinion meshing with a ring gear constituting a part of the driven element, and the speed varied by the adjustment of the traction ring longitudinally of the tapered rollers. The power transmission mechanism is adjusted to vary the speed of the output shaft thereof by the rotative movement of a shaft 38 forming a part of a shifter for adjusting the traction ring of the transmission mechanism, by a crank arm 39 fixed on a shaft 38' secured axially to and constituting an extension of the shifter shaft 38, shaft 38' being journaled in a bearing member 39' fixed on the inside of a housing B mounted upon the portion 22' of the brackets 22, as shown in Figure 6.

Figure 5:
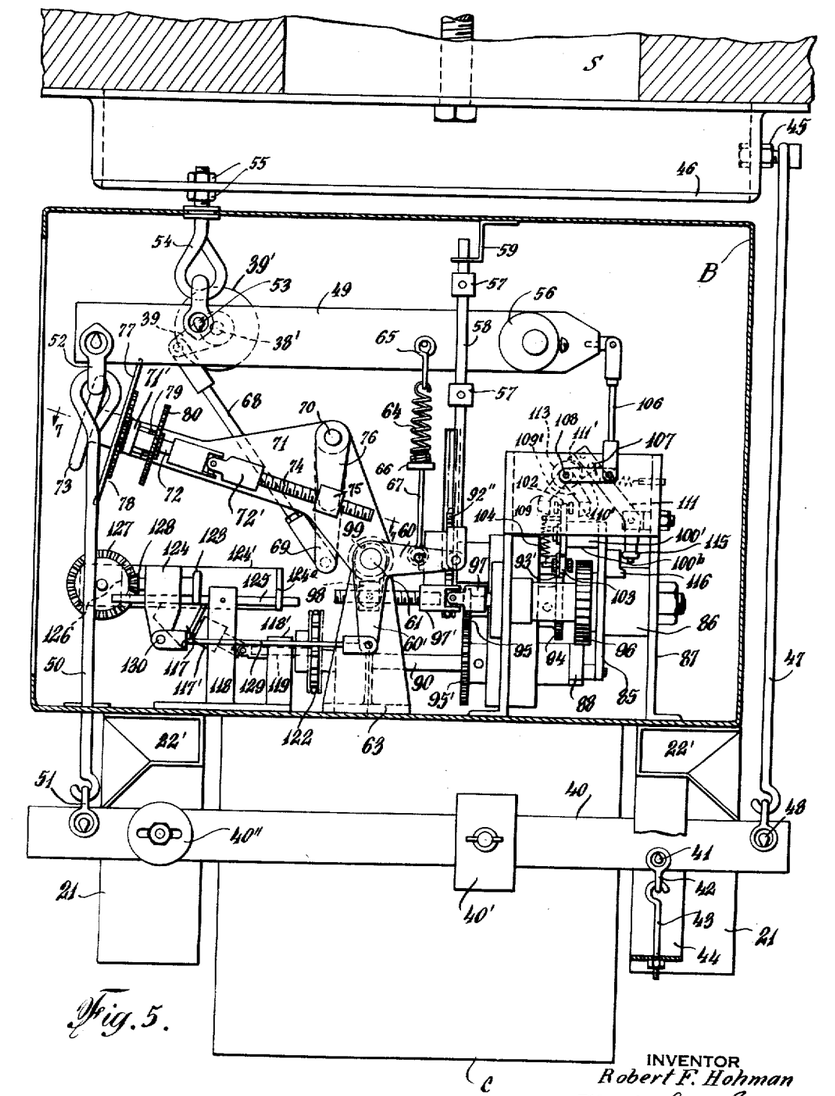
Figure 5 is an end elevation looking at the end of Figure 4 with the enclosing housing shown in section.

To counterbalance material fed by the conveyer to one side of the pivot support of the carrier frame the end of the carrier frame at the opposite side of the pivotal support thereof is suspended from adjacent one end of a weighing lever 40 by knife edge pivots 41 fixed in and extending from opposite sides of the lever engaging the wall of openings at the ends of a clevis 42 and the hooked end of the rod 43 engaging the clevis is extended through an opening on the leg connecting portion of a substantially U-shaped bracket 44 fixed to and extending downwardly from the extension 22' of one of the brackets 22, in the present instance the one at the right as viewed in Figure 5, and a nut threaded thereon at the outer side of the bracket 44. The short end of the lever is supported from a fixed support, and as shown is suspended from a stud 45 fixed in a member 46 secured to the support S by a rod 47 pivotally supported at one end on said stud and the opposite end formed with a hook engaging a clevis having eyes at the ends which are engaged by knife edge pivots extended laterally from the lever, as shown at 48. The long end of the lever is connected to the end of a pivotally supported beam 49 by a link 50 one end of which engages a clevis having openings at the ends engaged by knife edge pivots extending from opposite sides of the lever, as at 51, and the opposite end of the rod provided with an eye engaged by a clevis suspended from knife edge pivots extending from opposite ends of the beam, as at 52. The beam is supported by knife edge pivots extended laterally from the beam near one end engaging openings in a clevis, as at 53, the clevis engaging an eye at the end of a rod 54 extended through an opening in the top of the housing and connected to the member 46, as by nuts 55. A counterbalancing weight 56 is eccentrically mounted near the extremity of the long end of the beam. The long end of the beam is adapted to have deflecting movement between a pair of stops 57 mounted on a rod 58 to extend transversely above and below the beam, the rod being guided at the upper end in a bracket 59 fixed to the top of the housing and pivotally connected at the lower end to one arm of a bell crank lever 60 fixed on a shaft 61 rotatably mounted in bearings 62 integral with vertically extending portions at the opposite ends of a bracket 63 mounted on the bottom of the housing, which shaft is for a purpose hereinafter described. To further counterbalance the beam and prevent chattering movement thereof a spring 64 of predetermined length and tension is connected at one end to a clevis suspended from pivots extended laterally from the beam, as at 65, and a head 66 connected to the opposite end of the spring and having an adjustable connection with a rod 67 also connected to the arm 60 of said bell crank lever. The lever 40 has a counterbalancing weight 40' adjustably mounted thereon as well as a calibrating weight 40''.

Figure 4:
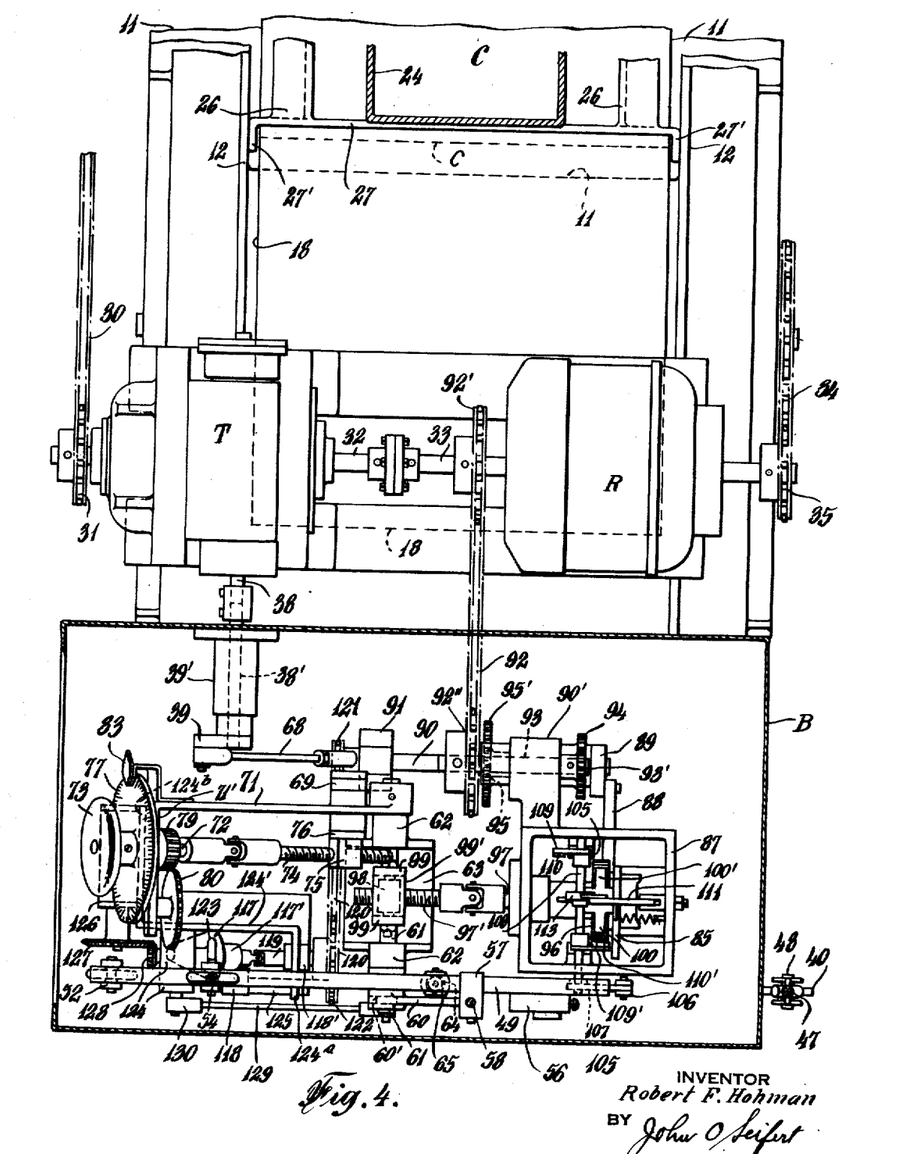
Figure 4 is a plan view, on an enlarged scale, looking at the top of Figure 1 and showing the settable means to counterbalance material of predetermined weight on the conveyer, the means to actuate and set the variable speed actuating means for the conveyer to actuate the conveyer to feed material of predetermined weight and indicate said setting, and the means rendered active by a variation in the weight of the material fed by the conveyer to adjust the conveyer actuating means and vary the speed of travel of the conveyer inversely to said variation in the weight of the material, and an enclosing housing for said means being shown in section.
Figures 7, 8, 9, 10:
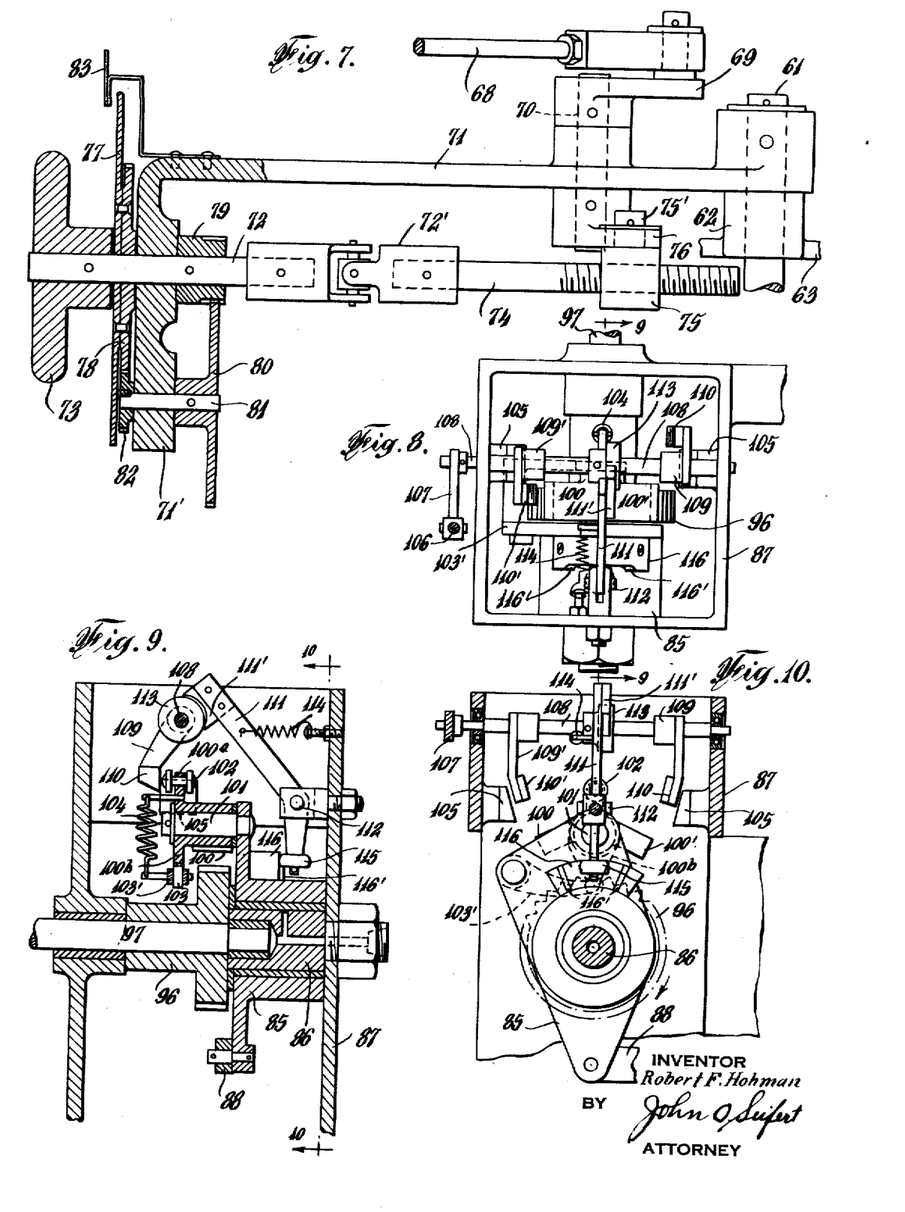
Figure 7 is a detail view in plan and partly in section of the settable means for actuating the adjusting means for the variable speed conveyer actuating means and the indicating means to indicate the weight of the material fed by the conveyer.
Figure 8 is a plan view of the means rendered active by a variation in the weight of the material fed by the conveyer to actuate the adjusting means for the variable speed conveyer actuating means to vary the speed of travel of the conveyer.
Figure 9 is a sectional view taken on the line 9—9 of Figure 8.
Figure 10 is a sectional view taken on the line 10—10 of Figure 9.

To feed material of a predetermined weight at a constant or predetermined average rate from the receptacle H by the conveyer, means are provided to adjust and set the variable speed power transmission mechanism to actuate the conveyer at a predetermined speed proportional to the weight of the material to be fed. For this purpose means arranged in the housing are connected to the crank 39 fixed on the shaft 38' connected to the shifter shaft 38 and operative to impart rotative movement to said shafts to adjust the power transmission mechanism T, said means, as shown, comprising a rod 68 (Figures 4, 5 and 7) pivotally mounted at one end on a pin extended laterally from the crank arm 39 and pivotally connected at the opposite end to a pin extended laterally from an arm 69 fixed on one end of a stud shaft 70 rotatably mounted in a carrier in the form of a substantially triangular plate 71, the shaft being mounted in the angle of the plate intermediate the ends thereof with the arm disposed at one side of the plate. The plate has a laterally extending boss at one end whereby it is fixed on one end of the shaft 61 to extend upwardly and laterally from said shaft, as shown in Figures 4, 5 and 7. The opposite end of the plate 71 is extended at a right angle to the body of the plate and a shaft 72 is rotatably mounted in said right angle portion 71' of the plate, the shaft 72 having a hand manipulating wheel 73 fixed on the outer end thereof and connected by a universal joint 72' at the opposite end to another shaft 74 having screw threaded connection with an opening in a block 75 pivotally connected, as shown at 75' in Figure 7, to an arm 76 fixed on the shaft 70 at the side of the plate 71 opposite the side at which the arm 69 is disposed. By rotating the shafts 72, 74 through the hand wheel 73 the arm 76 is rocked and therewith the arm 69 through the shaft 70, and movement of the arm 69 is transmitted to the adjusting shafts 38, 38' of the transmission mechanism through the connection of said arm 69 by the rod 68 with the crank arm 39 on shaft 38', thereby varying the speed of the output shaft 32 of the transmission mechanism and the speed of travel of the conveyer, the rotation of said output shaft 32 and the speed of travel of the conveyer being increased by rotating the hand wheel to the right and the rotation of said shaft 32 and the speed of travel of the conveyer reduced by rotating the hand wheel to the left. Indicating means is provided to indicate the predetermined weight of the material to be fed by the conveyer, or the rate at which material is to be fed by the conveyer, which indicating means is adapted to be adjusted and set simultaneously with the setting of the transmission mechanism by the hand wheel 73. As shown the indicating means comprises a dial 77, which may be graduated in tons or pounds per hour, rotatably mounted on the shaft 72 between the hand wheel and the right angle portion 71' of the plate 71, the dial rotating with a gear 78 also rotatable on the shaft 72. To transmit the rotation of the shaft 72 to the gear 78 and the dial a pinion 79 fixed on the shaft 72 meshes with a gear 80 fixed on one end of a shaft 81 rotatably mounted in the right angle end portion 71' of the plate 71 and having a pinion 82 fixed on the opposite end thereof meshing with and rotating the gear 78 and the dial. The dial is rotated relative to a pointer 83 fixed on the plate 71. To indicate whether or not the weighing or balancing mechanism as well as the transmission mechanism has been properly set whereby the conveyer will travel at a speed to feed material from the receptacle H at the predetermined weight indicated by the dial the parts will assume the position with the pointer 83 in register with a pointer 84 fixed on the housing and extending toward the indicator dial, the pointer 84 being disposed relative to a window in a releasable closure 58' for an opening at one end of the housing and through which opening access may be had to the housing, and through which window the operation of the parts within the housing may be observed, as shown in Figure 1.

The outlet of the receptacle chute is adapted to permit of the discharge of material of predetermined volume from the receptacle, the weighing or balancing mechanism is set to counterbalance material of predetermined weight on the conveyer, and the conveyer actuating means is set to actuate the conveyer to travel at a predetermined speed to feed material discharged onto the conveyer from the receptacle H of said predetermined weight off from the conveyer. However, there may be a variation, decrease or increase, in the specific gravity of the material itself, or there may be crowding of lumps of material below the cut off edge 25 of the outlet of the chute, with the result that the conveyer will not feed material of said predetermined weight at a constant rate. To compensate for such variations in the weight of the material fed by the conveyer and discharged off from the conveyer a stream of material of said predetermined weight, or at an average of the rate of said predetermined weight, the speed of travel of the conveyer is varied, increased or decreased, in inverse proportion to the variation in said weight of the material. Thus an overweight stream will be discharged off from the conveyer when it travels at a speed less than the speed at which it is set to feed material of said predetermined weight, and an underweight stream will be discharged off the end of the conveyer when it travels at a speed greater than the speed at which the conveyer is set to feed material of said predetermined weight, the result being the discharge of material off the end of the conveyer at said predetermined weight or an average thereof. Means are, therefore, provided to automatically effect adjustment of the conveyer actuating means and the speed of travel of the conveyer in inverse proportion to the variation in said weight of the material, which means is normally inactive to adjust the conveyer actuating means when material of the predetermined weight is fed at a constant rate by the conveyer and rendered active to adjust the conveyer actuating means and the speed of travel of the conveyer by a variation in said weight of the material fed by the conveyer. This means is actuated from the conveyer actuating means and controlled by the weighing or balancing means affected by tilting movement of the pivoted conveyer carrying frame by an increase or decrease in said weight of the material on the conveyer, and as shown in Figures 8, 9 and 10 comprises an oscillator in the form of a lever 85 pivotally mounted with an interposed bushing on a stud 86 fixed in and extending laterally from a vertically extending portion of a bracket 87 mounted upon the bottom of the housing. To oscillate the lever 85 one arm of the lever below the axis of the stud 86 is connected by a rod 88 to a crank arm 89 fixed on a shaft 90 journaled in a bracket 91 and an arm 90' extending laterally from the bracket 87, as shown in Figures 4 and 6. The shaft 90 is rotated from the input shaft 33 of the speed reducing mechanism R by a sprocket chain 92 passing around a sprocket wheel 92' on said shaft 33 and a sprocket wheel 92" fixed on the end of a shaft 93 journaled in the bracket arm 90', the rotation of the shaft 93 being transmitted to the shaft 90 through an intermediate shaft 94' by a pinion 93' fixed on the opposite end of shaft 93 meshing with a pinion 94 fixed on shaft 94', and a pinion 95 on said latter shaft meshing with a pinion 95' on shaft 90. The oscillatory lever 85 pivotally carries a pawl above its axis of oscillation adapted by the oscillation of said lever 85 to transmit the oscillatory movement of the lever to rotation of a toothed wheel 96 fixed on and transmitting the rotation thereof to a shaft 97 journaled in a bearing in the bracket 87 and having a pilot bearing in the end of the stud 86, as shown in Figure 9. The shaft 97 has a universal joint connection with a shaft 97' having threaded connection with an opening in a block 98 pivotally carried between a pair of arms 99 integral with and extending downwardly from a sleeve or hub 99' fixed on the shaft 61, as shown in Figures 4, 5 and 6. The pawl (Figures 8, 9 and 10) is arranged with a pair of pallets 100, 100' diverging from a hollow body portion of the pawl and whereby the pawl is pivotally mounted on a stud 101 fixed in and extending forwardly from the oscillatory lever 85, the pawl having an arm 100ª projecting upwardly from the forward end of the body midway the pallets and an arm 100ᵇ extending downwardly from said body opposite the arm 100ª the opposite edges of said latter arm converging from the body of the pawl and having a V notch in the end thereof. The pawl arm 100ª carries a pair of rollers mounted on a shaft carried by said arm with the rollers disposed at opposite sides of the arm, as shown at 102 in Figure 9. The pawl is normally releasably held in position to maintain the pawl pallets out of engagement with the teeth of the wheel 96 during the oscillatory movement of the lever 85 by a roller 103 rotatably mounted on a pin within a bifurcation at the end of a detent arm 103' (Figure 9) engaging in the notch in the end of the pawl arm 100ᵇ, the detent arm being pivotally mounted at the opposite end of the lever 85 and the roller carrying end urged in a direction toward the pawl arm 100ᵇ by a spring 104 attached at one end to the extended end of the pin carrying the roller 103 and the opposite end attached to a pin fixed in and extending forwardly of the pawl arm 100ª, as shown in Figure 9. The pawl is normally in the position shown in Figures 8, 9 and 10 when the material is fed by the conveyer at the predetermined set rate, the pawl being retained by the detent roller 103 out of engagement with the teeth of the wheel 96 as the pawl participates in the oscillatory movement of the lever 85. The pawl is moved to said position by the rollers 102 carried by the pawl arm 100ª engaging by the oscillation of the lever 85 with one of a pair of fixed abutments 105 on the bracket 87 disposed in the path of movement of said rollers at opposite sides of the pivot support of the pawl.

Should there be a variation in said weight of the material fed by the conveyer the forward end of the conveyer carrier frame will tilt upwardly or downwardly depending upon whether there is a decrease or increase in the weight of said material. An increase in said weight of the material will cause the forward end of the carrier frame and the conveyer to tilt downwardly and the opposite end carrying the conveyer actuating and regulating means to tilt upwardly, the pivot support of the lever 40 moving upwardly therewith (Figure 5) rocking said lever on its pivot support 48 and deflecting the long end of the lever upwardly and said lever through its connection 50 with the beam 49 deflecting the short end of the beam upwardly and the long end of the beam downwardly. The long end of the beam is pivotally connected to one end of a rod 106 the opposite end of which rod is pivotally connected to an arm 107 (Figure 5) fixed on a rock shaft 108 rotatably supported at the ends in the bracket 87 (Figure 10), said shaft having a pair of arms 109, 109' fixed thereon at opposite sides of the axis of oscillation of the pawl carrying lever 85 and carrying abutments 110, 110' at the end and sides thereof to extend inwardly toward the axis of said lever, the arms extending downwardly and diverging in opposite directions from the rock shaft and when the beam is in position of equilibrium positioned with the arm 109 disposed at one side of the axis of the rock shaft 108 and an abutment 105 and the other arm 109' disposed at the opposite side of the rock shaft and the other abutment 105, as shown in Figures 5 and 8. As the beam 49 tilts downwardly it rocks the shaft 108 to position the arm 109' with the abutment 110' in the path of movement of the rollers 102 carried by the pawl arm 100ª and said rollers engaging the abutment 110' and thereby moving the pawl so that the pallet 100' will be positioned to engage a tooth of the wheel 96 and position the detent roller 103 in engagement with the declining side edge of said arm 100ᵇ at the right as viewed in Figure 10 and retaining the pawl in position with said pallet 100' in said position. As the pawl oscillates with the lever 85 the pawl pallet 100' will engage the teeth of and rotate the toothed wheel 96 in the direction indicated by the arrow in Figure 10, and thereby rotate the shafts 97, 97', the shaft 97' through its screw threaded connection with the block 98 carried by the shaft 61 moving said block to the right as viewed in Figures 4 and 5, and correspondingly rotating the shaft 61 and with it the carrier 71 with the means mounted thereon for actuating and setting the transmission adjusting shafts 38, 38' and actuating said shafts to adjust the transmission mechanism T to decrease the speed of travel of the conveyer inversely to said increase in the weight of the material and a proportional reduction in the volume of material fed by the conveyer from the material supply receptacle H. This rotation of the shaft 61 causes upwardly deflecting movement of the lever arm 60 relieving the beam 49 of the spring tension imposed on the beam by the spring 64 to permit self-balancing of the beam. This automatic self-balancing of the beam continues until the relief of said spring tension permits the beam 49 to again assume its horizontal equilibrium and neutral position when regulation of the power transmisson mechanism and speed of travel of the conveyer ceases. The upward movement of the lever arm 60 also adjusts the beam guards 57 upwardly and should the weight variation exceed the allowable limit of the mechanism the lower beam guard 57 will be brought into engagement with and lift the beam to its non-regulating horizontal position. The same safeguard is provided by the upper beam guard 57 upon downward movement of the lever arm 60, except that the tension of the spring 64 on the beam is increased instead of relieved from the beam. The movement of the beam 49 to its horizontal position of equilibrium rocks the abutment carrying shaft 108 to position the arm 109' out of the path of movement of the rollers 102 carried by the pawl arm 100ª and said rollers by the oscillation of the lever 85 engaging a fixed abutment 105 and thereby moving the pawl to inactive position with the pawl pallets out of engagement with the toothed wheel 96 and the pawl is retained in said position by the detent roller 103 engaging the notch in the end of the pawl arm 100ᵇ, as shown in Figures 4 and 10.

Should there be a decrease in said weight of the material fed by the conveyer the forward end of the conveyer carrier will tilt upwardly and correspondingly tilting the opposite end of the carrier downwardly, the pivot support of the lever 40 participating in said downward movement of the carrier and rocking said lever on its pivot support 48 to move the long end of the lever downward, which movement of the lever is transmitted to the short end of the beam 49 through the connecting rod 50 and deflecting the long end of the beam upwardly. This upward movement of the beam 49 rocks shaft 108 to position the arm 109 with the abutment 110 in the path of movement of the rollers 102 carried by the pawl arm 100ᵃ and the oscillation of the pawl carrying lever 85 engaging said rollers 102 with abutment 110 and thereby moving the pawl arm 100ᵃ to position so that the pawl pallet 100 will be positioned to engage the teeth of and rotate the wheel 96 in a direction opposite to that indicated by the arrow and the detent roller 103 to engage with the declining side edge at the left of the pawl arm 100ᵇ, as viewed in Figure 10, to retain the pawl in said position as the pawl participates in the oscillatory movement of the lever 85, the wheel 96 rotating the shafts 97, 97' and through the screw thread connection of the shaft 97' with the block 88 on shaft 61 move said block to the left, as viewed in Figures 4 and 5, and correspondingly rotate the shaft 61 and move therewith the carrier 71 with the means mounted thereon for actuating the adjusting shafts 38, 38' to adjust the transmission mechanism T to increase the speed of travel of the conveyer inversely to said decrease in said weight of the material and effect a proportional increase in the volume and weight of the material fed by the conveyer from the material supply means H. As soon as the weight of the material is corrected the conveyer carrier and beam 49 will move to position of equilibrium, the beam rocking the shaft 108 to position the arm 109 with the abutment 110 carried thereby out of the path of movement of the rollers 102 carried by the pawl arm 100ᵃ, and said rollers by the oscillation of the lever 85 engaging a fixed abutment 105 and thereby restoring the pawl to position with the pawl pallets out of engagement with the teeth of the wheel 96 and retain the pawl in said position by the detent roller 103 engaging the notch in the end of the pawl arm 100ᵇ.

To releasably hold the shaft 108 against movement during the engagement of the rollers 102 with one of the abutments 110 or 110' to avoid reaction of the beam and the possibility of moving said abutments out of the path of movement of said rollers 102, brake mechanism is provided comprising a lever 111 of obtuse angle form in side elevation, one arm of which lever is longer than the other, is pivotally supported at the angle of the lever arms in a bracket fixed to the frame 87, as shown at 112, with the long arm of the lever extending upwardly and diagonally of the shaft 108 and carrying a shoe 111' at and extending laterally from the end thereof having an arcuate face conforming to the curvature of and adapted to engage the periphery of a wheel 113 fixed on the shaft 108, the lever being urged by a spring 114 to position with the shoe out of engagement with the wheel 113. The other arm of the lever 111 extends downwardly below the pivot support of the lever and carries a roller 115 urged by the spring 114 into engagement with and to follow a cam face on a projecting portion 116 on the hub of the lever 85, the cam face being of arcuate recess form extending circumferentially of the hub of the lever 85 and having raised portions 116' at the opposite ends, as shown in Figures 8, 9 and 10. As the lever 85 is oscillated the roller 115 rides along the cam face and up the raised ends thereof just prior to the pawl rollers 102 engaging an abutment on the arms 109, 109' or the fixed abutments 105, and as the pawl rollers 102 move away from said abutments the roller 115 will ride off from said raised cam portions freeing the shaft 108 for actuation by the beam 49.

Means are provided to integrate and register the cumulative weight of the material fed by the conveyer, and shown as comprising a friction cone 117 carried by a shaft extending axially from the end of larger diameter of the cone and whereby the cone is rotatably supported in a boss 117' extending laterally from an upstanding portion 118 of a bracket mounted upon the bottom of the housing with the upper surface of the cone extending in a horizontal plane, as shown in Figure 5. The cone carrying shaft has a universal joint connection with a shaft 119 rotatably mounted in a vertical member 118' of the bracket from which the member 118 extends. The shaft 119 and thereby the cone is rotated at a speed proportional to the speed of travel of the conveyer from the shaft 90 (Figure 4) by a sprocket chain 120 passing around sprocket wheels 121, 122 fixed on the shafts 90, 119, respectively. A friction wheel 123 engages and is frictionally driven from the horizontal surface of the cone, said wheel being fixed on a shaft rotatably mounted in a portion 124 projecting from a bracket 124' and extending parallel of a right angle end portion 124ᵃ of said bracket. The bracket is slidably mounted by said portion 124 and right angle end portion 124ᵃ on the opposite end portions of a rod 125 fixed in and extending from opposite sides of the vertical bracket member 118 and disposed at one side of the axis of rotation of the friction wheel, the friction wheel being frictionally engaged with the cone by the weight of said bracket 124'.

To indicate and register the cumulative weight of the material fed by the conveyer there is provided a suitable register, shown in a conventional manner at 126, fixed on an end portion 124ᵇ of the bracket 124 extending at a right angle in a direction opposite to the end portion 124ᵃ. To operatively connect the register with the friction wheel carrying shaft a gear 127 operatively connected to and driving the prime mover of the register is driven by a pinion 128 on the friction wheel carrying shaft meshing with said gear 127. The variable speed power transmission mechanism T is manually adjusted and set to actuate the conveyer to travel at a speed in direct proportion to the rate of feed of the material, and simultaneously therewith the register actuating friction wheel is adjusted to position on the friction cone to be driven at a speed proportional to speed of travel of the conveyer and actuate the register to totalize the correct weight of the cumulative material fed by the conveyer. However, when there is a variation in said weight of the material fed by the conveyer said regulating means for the transmission mechanism is rendered active to vary the speed of travel of the conveyer in inverse proportion to the variation in said weight of the material, and means are provided to cause the friction wheel to automatically assume a position on the friction cone to vary the rotation of the friction wheel to compensate for the variation in the speed of travel of the conveyer. Should there be an increase in the load or weight of the material fed by the conveyer the speed of travel of the conveyer is decreased and the shaft 61 rotated, as hereinbefore described, to move the lever arm 60' to the right as viewed in Figure 5, and through the connection of said lever arm 60' by the rod 129 with the portion 124 of the bracket 124' move said bracket 124, 124' and therewith the register and friction wheel 123 to position the friction wheel in contact with a portion of larger diameter of the friction cone and increase the speed of rotation of the friction wheel to actuate the register to compensate for the increase in the weight of the material fed by the conveyer. Should there be a decrease in said weight of the material fed by the conveyer the transmission mechanism is regulated to increase the speed of travel of the conveyer, the shaft 61 being rotated to move the lever arm 60' to the left and through its connection with the portion 124 of the bracket 124' move said bracket and therewith the register and friction wheel 123 to position the friction wheel in contact with a portion of smaller diameter of the friction cone to decrease the speed of rotation of the friction wheel and actuation of the register to compensate for the decrease in said weight of the material fed by the conveyer.

Various modifications may be made in the construction and arrangement of the parts without departing from the scope of the invention, and portions of the invention may be used without others and come within the scope of the invention.

Having described my invention, I claim:

1. In material feeding means, weighing mechanism including a traveling material receiver and adjustable counterpoise to counterbalance material of predetermined weight on the material receiver, means to supply material to said material receiver, regulatable actuating means for said receiver, settable means to regulate the operation of said actuating means and actuate the material receiver to travel at a speed to feed material at the rate of said predetermined weight from the material supply means, and means rendered active by the weighing mechanism by a variation in said predetermined weight of the material fed by the receiver to regulate the actuating means to vary the operation of the receiver actuating means and speed of travel of the receiver inversely to the variation in said weight of the material and average the feeding of material by the receiver at an average of the rate of said predetermined weight.

2. In material feeding means, weighing mechanism including a traveling material support and adjustable counterpoise to counterbalance material of predetermined weight on the support, a supply receptacle having an outlet for supplying material to said support, regulatable actuating means for the support, means for regulating the operation of said actuating means to vary the speed of travel of the support, means to set said regulating means to effect operation of the actuating means to actuate the material support at a speed to feed material of said predetermined weight at a constant rate from the receptacle, and means rendered active by the weighing mechanism by a variation in said predetermined weight of the material fed by the material support to actuate said regulating means to vary the operation of the actuating means for and the speed of travel of the support inversely to the variation in said weight of the material and feed material by the support at an average of the rate of said predetermined weight.

3. In material feeding means, weighing mechanism including a traveling material conveyer and adjustable counterpoise to counterbalance material of predetermined weight on the conveyer, a material supply receptacle having an outlet discharging material onto the conveyer, actuating means for the conveyer, means to vary the operation of said actuating means to actuate the conveyer at a predetermined speed to feed material of said predetermined weight at a constant rate from the receptacle and off from the conveyer, means operative from the conveyer actuating means normally inactive by the travel of the conveyer at a constant speed and feeding of material at the rate of said predetermined weight by the conveyer and rendered active by the movement of the weighing mechanism out of equilibrium by a variation in said predetermined weight of the material to vary the operation of said conveyer actuating means and speed of travel of the conveyer in inverse proportion to the variation in said weight of the material and feed material at an average of the rate of said predetermined weight.

4. In material feeding means, material supply means, weighing mechanism including a traveling material conveyer and adjustable counterpoise to counterbalance material of predetermined weight on the conveyer, means to actuate said conveyer, means to regulate the operation of said conveyer actuating means to vary the speed of travel of the conveyer, manually operative means to set said regulating means to effect operation of the conveyer actuating means to actuate the conveyer at a predetermined speed to feed material of said predetermined weight at a constant rate from the material supply means and off from the conveyer, and means automatically operative by a variation in said predetermined weight of the material on the conveyer to render said regulating means active to regulate the operation of the conveyer actuating means to vary the speed of travel of the conveyer in inverse proportion to the variation in said weight of the material and feed material by the conveyer at an average at the rate of said predetermined weight.

5. In material feeding means, material supply means, weighing mechanism including a traveling conveyer adapted to receive and feed material from the material supply means and means to counterbalance material of predetermined weight on the conveyer, regulatable actuating means for the conveyer, means to regulate the operation of said actuating means to actuate the conveyer to travel at a predetermined speed to feed material from the material supply means at the rate of said predetermined weight counterbalanced on the conveyer, means operative from the conveyer actuating means to actuate said regulating means, said means being normally inactive to actuate said regulating means by the feeding of material of said predetermined weight by the conveyer from the supply means and rendered active by a variation in said weight of the material fed by the conveyer to actuate said regulating means to vary the operation of the conveyer actuating means and speed of travel of the conveyer in inverse proportion to the variation in said weight of the material and feed material at the average of the rate of said predetermined weight by the conveyer.

6. In material feeding means, weighing mechanism including a traveling conveyer and means to counterbalance material of predetermined weight on the conveyor, a receptacle having an outlet for discharging material onto the conveyer, regulatable means for actuating the conveyer at a constant speed and feed material discharged thereon at the rate of a predetermined weight counterbalanced on the conveyer, means to indicate the weight of the material on the conveyer and the rate at which material is to be fed by the conveyer, manually operative means to set the means to regulate the operation of said actuating means to actuate the conveyer at a predetermined speed to feed material at the rate of said predetermined weight from the receptacle and adjust said indicating means to indicate said weight, means operative from the conveyer actuating means to actuate said regulating means controlled by the weighing mechanism to render said means inactive to actuate the regulating means by the feeding of material of said predetermined weight from the supply means by the conveyer and rendered active by a variation in said predetermined weight of material fed by the conveyer to actuate the regulating means to vary the operation of the conveyer actuating means and speed of travel of the conveyer inversely to said variation in said weight of the material and feed material by the conveyer at an average of the rate of said predetermined weight.

7. In material feeding means, weighing mechanism including a traveling conveyer and means to counterbalance material of predetermined weight on the conveyer, means to supply material to said conveyer, regulatable, actuating means for the conveyer, manually operative means to adjust said regulating means to control the operation of said actuating means to actuate the conveyer at a predetermined speed to feed material from the material supply means by the conveyer at the rate of the predetermined weight counterbalanced on the conveyer, means operative from the conveyer actuating means to adjust the regulating means for the conveyer actuating means, means operative to disconnect said adjusting means from the regulating means by the counterbalancing and feeding of material of said predetermined weight by the conveyor, connect said adjusting means to and adjust said regulating means by a decrease in said weight of the material fed by the conveyer to regulate the operation of the conveyer actuating means to increase the speed of travel of the conveyer in inverse proportion to the decrease in said weight of the material on the conveyer, and connect said actuating means to and adjust the regulating means by an increase in the weight of the material on the conveyer to regulate the operation of the conveyer actuating means to decrease the speed of travel of the conveyer in inverse proportion to the increase in said weight of the material and maintain the feeding of the material at an average of the constant rate.

8. In material feeding means, a frame pivotally supported intermediate its ends on a horizontal axis of support, a conveyer mounted on said frame, means including variable speed transmission mechanism to continuously actuate said conveyer, means for supplying material to said conveyer, means for counterbalancing material of predetermined weight on the conveyer at one side the pivot support of the frame, means to regulate the transmission of the conveyer actuating means and speed of travel of the conveyer to feed material at the rate of said predetermined weight from the material supply means, and means rendered operative by a variation in said predetermined weight of material fed by the transmission mechanism of the conveyer to actuate said regulating means to vary the operation of the conveyer actuating means and speed of travel of the conveyer inversely to the variation in said predetermined weight of the material and feed the material at an average of the rate of said predetermined weight.

9. In material feeding means, a frame pivotally suspended to tilt about a horizontal axis of support, a conveyer mounted on said frame, means for supplying material to said conveyer above the axis of support of the frame, means mounted on the frame to continuously actuate said conveyer including power means and variable speed power transmission mechanism actuated from the means and actuating the conveyer, means to counterbalance material of predetermined weight on the conveyer, manually operative means to regulate the operation of said transmission mechanism to actuate the conveyer at a predetermined speed and feed material from the supply means at the rate of said predetermined weight, means operative from the conveyer actuating means to actuate said regulating means for the transmission mechanism, said means being normally inactive by the feeding of material of said predetermined weight by the conveyer and rendered active by a variation in said predetermined weight of the material fed by the conveyer to actuate said regulating means to regulate the operation of the transmission mechanism to vary the speed of travel of the conveyer to feed material in inverse proportion to the variation in said predetermined weight and feed material by the conveyer at an average of the rate of said predetermined weight.

10. In material feeding means, a frame pivotally supported to tilt about a horizontal axis, a conveyer mounted on said frame, settable means for counterbalancing material of predetermined weight on the conveyer, a receptacle having an outlet adapted to discharge material in predetermined volume onto the conveyer from above the axis of support of the frame, driving means for the conveyer including variable speed power transmission mechanism mounted on the frame operatively connected to the conveyer, means to adjust said power transmission mechanism to vary the output speed thereof and speed of travel of the conveyer, manually adjustable means to actuate the transmission adjusting means and set said transmission mechanism to actuate the conveyer at a predetermined speed and feed material at the rate of the predetermined weight from the receptacle, and means operative from the transmission mechanism to actuate said transmission mechanism adjusting means to vary the output speed thereof and speed of travel of the conveyer, said means being normally inactive to actuate the transmission adjusting means by the travel of the conveyer to feed material of said predetermined weight by the conveyer and rendered active by a variation in said weight of the material to actuate the transmission adjusting means to vary the output speed of the transmission mechanism and speed of travel of the conveyer in inverse proportion to the variation in said weight of the material and feed the material at an average of the rate of said predetermined weight.

11. In material feeding means, a frame pivotally supported intermediate its ends to tilt on a horizontal axis, a conveyer mounted on said frame, means to supply material to said conveyer above the axis of support of the frame, means including a lever fulcrumed at one end on a fixed support and on which one end of the frame is fulcrumed and adapted to counterbalance material of predetermined weight on the conveyer at the opposite side of said pivot support, means including a variable speed power transmission mechanism mounted on the frame to actuate the conveyer, a change speed actuator for said transmission mechanism, and settable means mounted on the end of the frame fulcrumed on the lever operative to actuate the change speed actuator of and adjust the transmission mechanism to actuate the conveyer to travel at a predetermined speed to feed material at the rate of the predetermined weight counterbalanced on the conveyer from the supply means.

12. Material feeding means as claimed in claim 11, wherein the settable means operative to actuate the change speed actuator of and adjust the transmission mechanism to actuate the conveyer at a predetermined speed, comprises a pair of connected arms, a carrier on which said arms are pivotally mounted, a link connecting one of said arms to the change speed actuator of the transmission mechanism, and a shaft rotatably mounted on the carrier having an adjustable connection with the other of said arms and operative by the rotation thereof to adjust the arms and connected change speed actuator to vary the output speed of the transmission mechanism and speed of travel of the conveyer.

13. In material feeding means, a frame pivotally supported intermediate the ends to tilt about a horizontal axis, a conveyer mounted on the frame, means to supply material to the conveyer above the axis of support of the frame, means including a lever fulcrumed at one end on a fixed support and having adjustable counterpoise weight thereon and on which one lever end of the frame is fulcrumed to counterbalance material of predetermined weight on the conveyer at the opposite side of the pivot support of the frame, means including variable speed power transmission mechanism mounted on the frame to actuate the conveyer, a change speed actuator for said transmission mechanism, and settable means including an indicator mounted on the frame at the side of the pivot support fulcrumed on the lever to actuate the change speed actuator to adjust the transmission mechanism to actuate the conveyer at a speed to feed material of the predetermined weight counterbalanced on the conveyer at a constant rate from the supply means and indicate said rate of feed of the material.

14. Material feeding means as claimed in claim 13, wherein the settable means comprises a pair of arms, a carrier on which said arms are pivotally mounted to move in unison, a link connecting one of said arms to the change speed actuator of the transmission mechanism, a shaft rotatably mounted on the carrier having screw threaded connection with the other of said arms and having a hand wheel mounted thereon to rotate the shaft and adjust the arms, a dial loosely mounted on said shaft, means to transmit the rotation of said shaft to the dial, and an indicator fixed on the carrier and disposed relative to the dial to indicate the weight at which rate the material is fed by the conveyer.

15. In material feeding means, a frame pivotally supported intermediate the ends thereof to tilt about a horizontal axis, a conveyer mounted on the frame, means to supply material to the conveyer above the axis of support of the frame, means including a lever fulcrumed at one end on a fixed support and on which one lever end of the frame is fulcrumed intermediate the ends to and nearer the end of the lever at which it is fulcrumed on the fixed support, counterpoise adjustable on the lever to counterbalance material of predetermined weight on the conveyer at the opposite side of said pivot support, a beam fulcrumed intermediate its ends on a fixed support to extend parallelly of and above the lever and connected at one end to the end of the lever opposite the fulcrum support thereof, a motor and variable speed power transmission mechanism driven from the motor operatively connected to and continuously driving the conveyer mounted on the frame, a change speed actuator for the transmission mechanism, a rotatable shaft, a carrier fixed on said shaft, a second shaft rotatable on an axis transverse to the axis of the first shaft and operatively connected thereto to transmit the rotation of the second shaft to rotative adjustment of the first shaft with the carrier and retain said first shaft in adjusted positions, means including an indicator mounted on the carrier and operatively connected to the change speed actuator of the transmission mechanism to adjust the transmission mechanism to actuate the conveyer at a speed to feed material from the material supply means at a rate of the predetermined weight counterbalanced on the conveyer when the beam is in position of equilibrium and indicate the weight of said rate of feed by the conveyer, means actuated from the transmission mechanism operative to rotate said second shaft and adjust the carrier with the means mounted thereon to actuate the change speed actuator to vary the output speed of the transmission mechanism and speed of travel of the conveyer, means controlled by the beam operative when the beam is in equilibrium to disconnect said means from the second shaft and connect said means to and rotate said second shaft by the movement of the beam out of equilibrium by a variation in the predetermined weight of the material counterbalanced on the conveyer and adjust the change speed actuator to vary the output speed of the transmission mechanism and speed of travel of the conveyer inversely to the variation in said predetermined weight of the material and feed the material at an average of the rate of said predetermined weight.

16. Material feeding means as claimed in claim 15, wherein the means actuated from the conveyer actuating means to rotate the second shaft comprises a ratchet wheel fixed on said second shaft, an oscillator juxtaposed to said wheel and oscillatory about the shaft, pawl means pivotally carried by the oscillator adapted to co-operate with the ratchet wheel by the oscillation of the oscillator to rotate said second shaft, yielding means to releasably retain the pawl means out of and in operative relation to the ratchet wheel, and the means controlled by the beam to connect and disconnect said actuating means for said second shaft comprising fixed abutments at opposite ends of the path of movement of the pawl means and adapted to be engaged by and actuate the pawl means to position out of operative relation with the ratchet wheel when the beam is in equilibrium, and adjustable abutments normally positioned out of the path of movement of the pawl means when the beam is in equilibrium and adapted to be moved into the path of movement of the pawl means by the movement of the beam out of equilibrium by a variation in said predetermined weight of the material fed by the conveyer to cause the pawl means to engage with an abutment and actuate the pawl means to position to co-operate with the ratchet wheel to adjust the change speed actuator to vary the speed of travel of the conveyer inversely to said variation in the predetermined weight of the material.

17. In material feeding means, weighing mechanism including a frame pivotally supported to have tilting movement about a horizontal axis, a traveling conveyer mounted on said frame, means to supply material to said conveyer from above the axis of support of the frame, and means to counterbalance material of predetermined weight on the conveyer at one side of the pivot support, means mounted on the frame including variable speed transmission mechanism operatively connected to and actuating the conveyer, manually operative means to adjust and set the variable speed transmission mechanism to vary the output speed thereof and actuate the conveyer at a predetermined speed and feed material at the rate of the predetermined weight counterbalanced on the conveyer from the material supply means, and means to integrate and register the cumulative weight of the material fed by the conveyer.

18. In material feeding means, weighing mechanism including a frame supported to have tilting movement about a horizontal axis, material supply means, a traveling conveyer mounted on said frame to feed material from said supply means, and means to counterbalance material of predetermined weight on the conveyer, means to actuate said conveyer including change speed mechanism operatively connected to the conveyer, manually operative means to adjust and set the change speed mechanism to actuate the conveyer at a speed to feed the material from the material supply means at the rate of the predetermined weight counterbalanced on the conveyer, a rotatable shaft having an adjustable connection with said adjusting means for the change speed mechanism operative by the rotation thereof to actuate said adjusting means to adjust the change speed mechanism and vary the speed of travel of the conveyer, means operative from the change speed mechanism to rotate said shaft normally disconnected from the shaft during the feeding of material at the rate of said predetermined weight by the conveyer, and means operative by a variation in said predetermined weight of the material counterbalanced on the conveyer to operatively connect and actuate said means from the change speed mechanism to rotate said shaft and actuate the adjusting means to adjust the change speed mechanism and vary the speed of travel of the conveyer inversely to said variation in the weight of the material and feed material at an average of the rate of said predetermined weight.

19. In material feeding means, a frame pivotally supported to have tilting movement about a horizontal axis, material supply means, a traveling belt conveyer mounted on said frame to feed material from the material supply means, and means to counterbalance the frame with material of predetermined weight on the conveyer, means including change speed mechanism operatively connected to and actuating the conveyer, means to adjust the change speed mechanism to vary the speed of travel of the conveyer, manually settable means to actuate the means to adjust the change speed mechanism to actuate the conveyer at a speed to feed material at the rate of the predetermined weight counterbalanced on the conveyer, an adjustable carrier for said settable means, means to actuate said carrier with the settable means and actuate the means to adjust the change speed mechanism to vary the speed of travel of the conveyer, and means actuated from the change speed mechanism to operate the actuating means for the carrier for the settable means normally disconnected from said carrier actuating means during the feeding of material of said predetermined weight by the conveyer and automatically connected thereto by a variation in said weight of the material and actuate the means to adjust the change speed mechanism to vary the speed of travel of the conveyer in inverse proportion to said variation in the weight of the material and feed the material at an average of the rate of said predetermined weight, and means actuated from the change speed mechanism and adjustable by the means to adjust the carrier for the settable means to integrate and register the cumulative weight of the material fed by the conveyer.

20. In material feeding means, weighing mechanism including a continuously traveling material receiver and adjustable means to counterbalance material of predetermined weight on the receiver, means to supply material to said receiver, means to actuate said receiver, means to vary the operation of said receiver actuating means and actuate the material receiver to travel at variable speed and feed material of said predetermined weight from the material supply means, and means rendered active by a variation in the predetermined weight of material on the receiver to vary the operation of the receiver actuating means and speed of travel of the material receiver inversely to any variation in said predetermined weight of the material and average the feeding of material by the receiver at the rate of said predetermined weight.

21. In material feeding means, weighing mechanism including a traveling material conveyer and means to counterbalance material of predetermined weight on the material conveyer, means to continuously actuate said conveyer, means to supply material to said conveyer, and means controlled by the weighing mechanism to vary the operation of said conveyer actuating means and actuate the conveyer to travel at a predetermined speed to feed material of said predetermined weight from the supply means and by a variation in said weight of the material vary the operation of the conveyer actuating means and speed of travel of the conveyer inversely to the variation in said weight of the material and average the feeding of material off from the conveyer at the rate of said predetermined weight.

22. In material feeding means, weighing mechanism including a traveling material conveyer and adjustable counterpoise to counterbalance material of predetermined weight on the conveyer, means to supply material to said conveyer, regulatable actuating means for the conveyer, means to regulate and set said actuating means to actuate the conveyer to feed material from the material supply means at the rate of said predetermined weight, and means rendered active by the weighing mechanism by a variation in said predetermined weight of the material to actuate said regulating means to vary the speed of travel of the conveyer inversely to any variation in the speed of travel of the conveyer to feed material of said predetermined weight and feed material by the conveyer at an average of the rate of said predetermined weight.

23. In material feeding means, weighing mechanism including a traveling conveyer and adjustable counterpoise to counterbalance material of predetermined weight on the conveyer, means to supply material to the conveyer, regulatable means for actuating the conveyer at a speed to feed material at the rate of the weight for which the counterpoise is set, and means controlled by the weighing mechanism to actuate the regulating means to regulate said actuating means to actuate the conveyer to travel at a speed to feed material from the supply means at the rate of the predetermined weight for which the weighing mechanism is set and vary the operation of said actuating means and speed of travel of the conveyer in inverse proportion to any variation in said predetermined weight of the material and average the feeding of material by the conveyer at the rate of said predetermined weight.

24. Material feeding means as claimed in claim 17 wherein the means to integrate and register the cumulative weight of the material fed by the conveyer comprises a friction member rotatable from the transmission mechanism at a speed proportional to the speed of travel of the conveyer, a friction wheel rotatable from said friction member, and a register operatively connected to and actuated from said friction wheel.

25. Material feeding means as claimed in claim 19, wherein the means to integrate and register the cumulative weight of the material fed by the conveyer comprises a friction member rotated from the change speed mechanism, a friction wheel driven from said friction member at a speed proportional to the speed of travel of the conveyer, and a register operatively connected to and actuated from said friction wheel.

26. Material feeding means as claimed in claim 19, wherein the means to integrate and register the cumulative weight of the material fed by the conveyer comprises a friction cone rotated from the change speed mechanism, a friction wheel frictionally driven from said cone at a speed proportional to the speed of travel of the conveyer, an adjustable support for said friction wheel to adjust the friction wheel along the cone, and means to connect the friction wheel support to and adjust the same from the means to adjust the carrier for the settable means and position the friction wheel on the cone to vary the rotation of the friction wheel proportional to variations in the speed of travel of the conveyer and actuate the register in correspondence with variations in the weight of the material fed by the conveyer.

ROBERT F. HOHMAN.

CERTIFICATE OF CORRECTION.

Patent No. 2,365,270.          December 19, 1944.

ROBERT F. HOHMAN.

It is hereby certified that error appears in the printed specification of the above numbered patent requiring correction as follows: Page 7, second column, line 36, for "average at" read --average of--; page 8, first column, line 23, after "regulatable" strike out the comma; line 67, strike out the words "transmission mechanism of the" and insert the same before "conveyer" in line 69; and second column, line 6, strike out "power" and insert the same before "means" in line 7; page 9, first column, lines 30 and 68, for "one lever" read --lever one--; line 70, strike out "to" after "ends"; and that the said Letters Patent should be read with this correction therein that the same may conform to the record of the case in the Patent Office.

Signed and sealed this 17th day of April, A. D. 1945.

(Seal)

Leslie Frazer
Acting Commissioner of Patents.

the weighing mechanism to actuate the regulating means to regulate said actuating means to actuate the conveyer to travel at a speed to feed material from the supply means at the rate of the predetermined weight for which the weighing mechanism is set and vary the operation of said actuating means and speed of travel of the conveyer in inverse proportion to any variation in said predetermined weight of the material and average the feeding of material by the conveyer at the rate of said predetermined weight.

24. Material feeding means as claimed in claim 17 wherein the means to integrate and register the cumulative weight of the material fed by the conveyer comprises a friction member rotatable from the transmission mechanism at a speed proportional to the speed of travel of the conveyer, a friction wheel rotatable from said friction member, and a register operatively connected to and actuated from said friction wheel.

25. Material feeding means as claimed in claim 19, wherein the means to integrate and register the cumulative weight of the material fed by the conveyer comprises a friction member rotated from the change speed mechanism, a friction wheel driven from said friction member at a speed proportional to the speed of travel of the conveyer, and a register operatively connected to and actuated from said friction wheel.

26. Material feeding means as claimed in claim 19, wherein the means to integrate and register the cumulative weight of the material fed by the conveyer comprises a friction cone rotated from the change speed mechanism, a friction wheel frictionally driven from said cone at a speed proportional to the speed of travel of the conveyer, an adjustable support for said friction wheel to adjust the friction wheel along the cone, and means to connect the friction wheel support to and adjust the same from the means to adjust the carrier for the settable means and position the friction wheel on the cone to vary the rotation of the friction wheel proportional to variations in the speed of travel of the conveyer and actuate the register in correspondence with variations in the weight of the material fed by the conveyer.

ROBERT F. HOHMAN.

---

CERTIFICATE OF CORRECTION.

Patent No. 2,365,270.

December 19, 1944.

ROBERT F. HOHMAN.

It is hereby certified that error appears in the printed specification of the above numbered patent requiring correction as follows: Page 7, second column, line 36, for "average at" read --average of--; page 8, first column, line 23, after "regulatable" strike out the comma; line 67, strike out the words "transmission mechanism of the" and insert the same before "conveyer" in line 69; and second column, line 6, strike out "power" and insert the same before "means" in line 7; page 9, first column, lines 30 and 68, for "one lever" read --lever one--; line 70, strike out "to" after "ends"; and that the said Letters Patent should be read with this correction therein that the same may conform to the record of the case in the Patent Office.

Signed and sealed this 17th day of April, A. D. 1945.

(Seal)

Leslie Frazer
Acting Commissioner of Patents.